Figure 1:
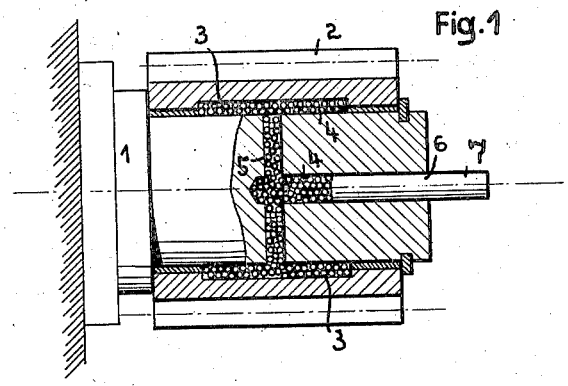

Aug. 2, 1938.   G. NIEMANN   2,125,617
ENGAGEABLE POWER TRANSMITTING DEVICE
Filed Feb. 26, 1936

Inventor
Gustav Niemann

Patented Aug. 2, 1938

2,125,617

UNITED STATES PATENT OFFICE 2,125,617

ENGAGEABLE POWER TRANSMITTING DEVICE

Gustav Niemann, Brunswick, Germany

Application February 26, 1936, Serial No. 65,803
In Germany March 13, 1935

6 Claims. (Cl. 192—58)

The invention relates to an engageable power transmitting device with which two co-axial parts are connected by friction, e. g. a friction clutch or a brake. In the new clutch or brake an enclosed space is provided between the two co-axial parts. This enclosed space is filled with balls and lubricant and has smooth friction surfaces on the one of the two co-axial parts, and has as well a displacing member, shutting in the said space, that is capable of moving axially and thereby pressing the balls against each other and against the moved friction surfaces. The displacing member has a smaller surface of pressure than the said smooth friction surface which serves for transmitting the power.

Further features of the invention are that this smooth friction surface is the cylindrical outer surface of a shaft or axle, the intermediate space is a cylinder ring, and the design of the displacing member, in combination with a second displacing member and the employment of the lubricant as cooling medium, as disclosed more fully by the drawing.

Hitherto use has been made either of friction clutches and brakes with friction lining of high friction coefficient, with resultant heavy wear, or power transmitting devices with lubricated friction surfaces, which then, however, necessitated heavy compression forces and consequently considerable displacement effort (the product of compressing force multiplied by the displacing path).

The new clutch or brake makes it possible for the first time to have simultaneously slight wear, slight displacing force and slight displacement effort. Furthermore, the clutch or brake can be comparatively small. These merits are attributable to the utilization of the quasi-hydrostatic properties of the balls embedded in the lubricant. They exert, similar to a liquid, an approximately all-round uniform pressure, so that, with a small displacing member, pressing and releasing and consequently engagement and disengagement can be accomplished on a short path with little effort. When disengaging the clutch, the balls are not lifted off the surfaces but simply relieved of pressure. Little attendance is required. The balls produce furthermore little friction in the lubricant and cause only insignificant idle running work and very slight wear, and, in this respect, behave in a manner similar to the liquids.

On the other hand, they produce in the loaded state, in contradistinction to a liquid, a firm clutch between the two co-axial parts. The new design of the power transmitting device makes it possible to utilize to advantage the said properties of the balls embedded in the lubricant with a view to attaining a displaceable clutch or brake with slight wear, slight displacement effort and of small dimensions.

The drawing illustrates three different constructions of the device according to the invention.

Figure 2:
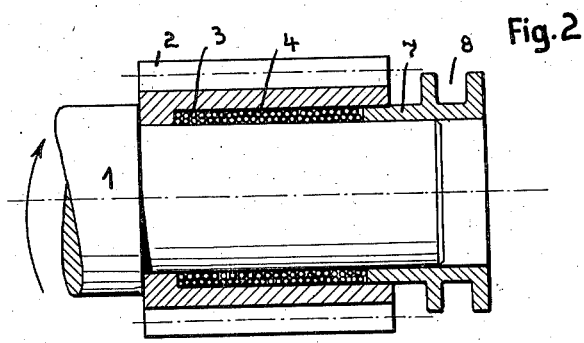
Figure 3:
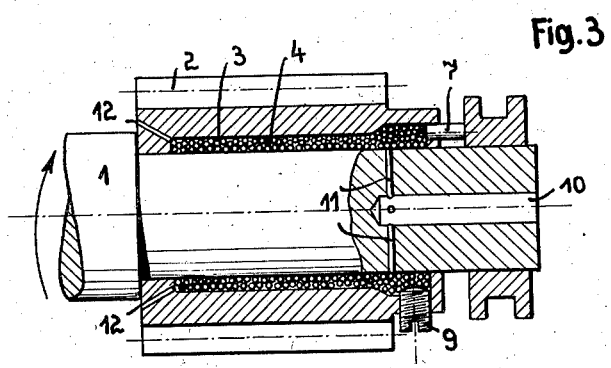

Fig. 1 shows the braking of a pinion on a fixed axle. Fig. 2 reproduces the coupling of a pinion to a revolving shaft, while Fig. 3 shows a modification of the clutch with the lubricant serving at the same time as cooling medium.

According to Fig. 1 of the said drawing the enclosed space 3 is located between the fixed axle 1 and the toothed wheel 2 that is to be braked on it. The space 3 in the toothed wheel 2 has smooth areas of contact 31, 32 and 33. The space is filled with small steel balls 4 and a lubricant and communicates with a central hole 6 by means of the passages 5. The displacing member 7 is provided to move axially in this hole. When the displacing member 7 is moved to the left, the pressure exerted by it on the balls 4 is continued to all surfaces of the intermediate space 3, so that the balls are pressed against the surfaces enclosing the space, whereby frictional connection is established between the parts 1 and 2. The pinion 2 is firmly braked on the axle 1 by this frictional connection. If the braking action is to be interrupted, the displacing member 7 is moved very slightly to the right, whereby the roller bodies 4 are relieved of pressure and consequently the frictional connection between the parts 1 and 2 is broken.

If the part 1 is a revolving shaft, the parts 1 and 2 are coupled to one another in order that they may execute the same revolving movement.

In the construction according to Figure 2 the displacing member takes the form of a pressure ring 7, which can be moved axially by known means, such, for example, as a fork moving in the sleeve 8, so that it can press against and move away from the balls 4 in the inclosed space 3 between the shaft 1 and the toothed wheel 2.

According to Figure 3, the displacing member may be provided in a position other than centrally with respect of the shaft 1. The operation is the same as that described with reference to Figure 1. In order to be able to reset the displacing member 7 in its original central position in the event of wear possibly setting in in the course of time, an adjusting screw 9 is foreseen in the body of the toothed-wheel 2. The wear of the friction surfaces on the parts 1 and 2 has the result that the balls in the initial position of the displacing member no longer fill the space 3 entirely in the released state. The displacing member 7 must therefore from the initial position up to the pressing of the balls cover a longer path than with new friction surfaces. If now the screw 9 is screwed further into the space 3, then the enlargement resulting from the wear of the friction surfaces is again neutralized, the balls again fill the space entirely and the displacing member with a slight displacement puts the balls under pressure. The wear is, however, very slight because the balls and the friction surfaces may be hardened at the surface. In this construction provision is made for carrying away heat through the lubricant. For this purpose the cooling agent is fed into the annular space 3 through a central hole 10 and passages 11, passing out through the outlets 12. The frictional heat generated on braking or as the result of repeated engagement of the clutch can thus be conveniently withdrawn.

I claim:

1. An engageable power transmitting device with two co-axial parts which are to be connected by friction, an enclosed space between these parts, friction surfaces on these parts as limitation for the intermediate space, all frictional surfaces of one of these parts being smooth, a filling of balls and lubricant in the space and a displacing member shutting in the said space, the said displacing member having a smaller pressure surface than the said smooth friction surface, the purpose being to press the balls together and against the friction surfaces.

2. An engageable power transmitting device as claimed in claim 1, in which the smooth friction surfaces consist of the cylindrical outer surface of the one clutch part.

3. An engageable power transmitting device as claimed in claim 1, in which the intermediate space is a cylinder ring.

4. An engageable power transmitting device with two co-axial parts which are to be connected by friction, one of them being a shaft or axle, an enclosed space between these parts, a filling of balls and lubricant in the space and an axially movable pin arranged centrally in this shaft or axle and shutting in said space, the said pin having a smaller pressure surface than the friction surface of the said space, the purpose being to press the balls together and against the moved friction surfaces.

5. In an engageable power transmitting device as claimed in claim 1 the combination of the displacing member mentioned in claim 1, the purpose being to press the balls together and against the moved friction surfaces, with a second adjustable displacing member, the purpose being to fix the working position of the said displacing member.

6. A power transmitting device with an enclosed space between the friction surfaces, a filling of roller bodies in this space and a displacing member shutting in the said space, the purpose being to press the roller bodies together and against the said friction surfaces, passages for feeding lubricant to the said space and outlets for the lubricant flowing through the said space and serving as the cooling medium.

GUSTAV NIEMANN.